United States Patent

[11] 3,623,144

[72] Inventors Burton J. Fischel
Glenview;
Frank J. Cerny, Jr., Riverside, both of Ill.
[21] Appl. No. 36,717
[22] Filed May 13, 1970
[45] Patented Nov. 23, 1971
[73] Assignee Motorola, Inc.
Franklin Park, Ill.

[54] IMPULSE NOISE-BLANKING SYSTEM EMPLOYING FIELD EFFECT TRANSISTORS
10 Claims, 2 Drawing Figs.

[52] U.S. Cl. .................... 325/478,
325/402, 325/479, 307/251, 330/35
[51] Int. Cl. .................... H04b 1/10
[50] Field of Search .................... 325/348, 402, 403, 472, 404, 477, 478, 479, 480, 484, 487, 488, 491; 307/251; 330/35

[56] References Cited

UNITED STATES PATENTS 3,339,144 8/1967 Squires .................... 325/402
3,550,012 12/1970 Paul .................... 325/478

*Primary Examiner*—Robert L. Griffin
*Assistant Examiner*—Albert J. Mayer
*Attorney*—Mueller and Aichele

ABSTRACT: The blanking system, for grounding the signal path of a receiver during the existence of impulse noise, includes field effect transistor blanking elements connected across the sections of a Butterworth filter located in the signal path. The field effect transistors are biased so that they produce virtually no blanking pulse injection, switching transient insertion or intermodulation between undesired signals. Thus, there need not be as much selectivity in the stages of the receiver preceding the blanker thereby facilitating an increase in the blanking rate of the blanker as compared to blankers utilizing bipolar transistors or diode-blanking elements. In addition, the blanking system includes desensitizing circuitry for reducing saturation of the noise detector otherwise caused by radio frequency signals occurring in the noise-sampling channel.

Inventors
FRANK J. CERNY JR.
BURTON J. FISCHEL.
BY
Mueller & Aichele
ATTYS.

Inventors
FRANK J. CERNY JR.
BURTON J. FISCHEL
BY Mueller & Aichele
ATTYS.

IMPULSE NOISE-BLANKING SYSTEM EMPLOYING FIELD EFFECT TRANSISTORS

BACKGROUND OF THE INVENTION

It is well known that certain kinds of electrically operated machinery and lightning sometimes produce impulse noise disturbances in the form of large and rapidly changing electromagnetic fields. An impulse noise disturbance typically includes spectral components which have large amplitude and which are evenly distributed throughout the frequency range extending from 1 hertz up to several hundred MHz. Thus, impulse noises are capable of temporarily interfering with radio waves within that spectrum which are modulated with desired signal information. This interference may be particularly critical in a mobile communications system wherein impulse noise energy from ignition systems, high-voltage leakage and lightning is coupled to a highly sensitive receiver and appears as an undesirable audio output. Moreover, impulse noise interference is generally more acute in heavily populated areas where there may be a large number of: vehicles utilizing spark ignition, electric motors, neon signs, and other electrical devices which emit impulse noises.

Many types of electrical circuitry are known for minimizing or limiting the effects of impulse noise disturbances in a radio receiver. Circuitry of one type removes the effect of the impulse noise by interrupting all signal conduction through the receiver for the duration of the impulse. These noise-blanking systems usually include circuitry in the first stages of the receiver which detect the existence of impulse noise and which produce a blanking pulse for the duration thereof. This blanking pulse has been utilized, for instance, to turn on a bipolar transistor or a diode blanking element which is connected between the signal conduction path and a reference or ground potential thereby essentially shunting all signals to ground for the duration of the impulse noise so that the interference is inaudible. The receiver can be blanked for the duration of noise impulses without seriously interfering with the desired signal quality for voice communication purposes, provided that the repetition rate and duration of the blanking pulses are kept below certain limits.

The bipolar transistor and diode-blanking elements, however, have inherent limitations which make them incompatible for use in the latest receivers requiring high-quality output signals. For instance, since selectivity is provided by the intermediate frequency (IF) stages of such receivers there may be unwanted modulated carriers present in the stages of the receiver preceding the IF stages. Since the blanker may immediately precede the IF, these unwanted carriers are applied thereto. The nonlinear characteristic of a bipolar transistor or diode-blanking element, even though it is nonconducting, intermodulates these unwanted signals to perhaps create an intermodulation product having frequency components within the band-pass of the IF stages. To relieve this source of interference, it is usually necessary to increase the selectivity of the receiver input stages preceding the blanker stage which reduces the modulation products by reducing the amplitudes of the undesired carriers. The increased selectivity however, also stretches or increases the duration of impulse noises thereby increasing the required duration of the blanking pulses which decreases the maximum permissible blanking rate.

Furthermore, the relatively large and nonlinear equivalent capacitance between the input and output terminals of a transistor or a diode tends to allow injection of portions of the blanking signal itself into the signal path of the receiver, thus interfering with the desired signal. To prevent this problem, prior art blanking circuits provide blanking pulses having long rise and fall times, thereby again increasing the duration and lowering the permissible blanking rate. Also, when a transistor-blanking element is switched by a blanking pulse, the change in potential at the terminals of the transistor tends to provide a switching transient which interferes with the desired signal. Thus, the foregoing undesirable characteristics of blankers employing bipolar transistors or diode-blanking elements result in degradation of the signal quality through the receiver when the receiver is both in its blanked and unblanked modes of operation.

Most impulse noise-blanking systems include radio frequency amplifiers whose purpose is to amplify noise information but which also amplify any signal within the band-pass thereof. A noise detector circuit is connected to the output of the amplifiers. Its purpose is to extract either the positive or the negative portion of a noise envelope which is then filtered to provide a blanking pulse. A major problem with most noise detectors is that a continuous radio frequency signal within the band-pass of the amplifier can render the detector nonresponsive to all impulse noise.

SUMMARY OF THE INVENTION

It is, therefore, an object of this invention to provide an improved noise-blanking circuit having a high intermodulation rejection capability for use in a radio receiver.

Another object of the invention is to provide an impulse-noise-blanking circuit which is operable at an increased blanking rate as compared to prior art blanking circuits while not undesirably interfering with the desired signal.

A further object of the invention is to provide an improved noise-blanking system wherein the noise detector is substantially immune to being rendered nonoperative in response to a continuous radio wave being applied thereto.

In brief, the impulse noise-blanking system utilizes: a noise amplifier; a noise detector which removes the envelope of the noise impulse from the output of the noise amplifier; and, a pulse amplifier which amplifies the envelope of the noise signal to form a blanking pulse. Moreover, a blanking circuit is connected between the input and the IF stage of the receiver. The blanking circuit includes a signal conduction path in the form of a Butterworth filter or similar band-pass filter. The drain and source electrodes of field effect transistors (FETS) are coupled from the signal path, across the elements of the filter, to a reference potential. The noise-blanking pulse at the output of the pulse amplifier is coupled to the gate electrodes of the FETS. The FETS are rendered conductive in response to the noise-blanking pulse to thereby shunt all signals to ground which pass into the Butterworth filter during the noise-blanking signal thus preventing the impulse noise disturbance from interferring with the desired output. Each filed effect transistor is biased on the linear portion of its drain to source characteristics so that it does not produce intermodulation between unwanted radio signals passing through the first stages of the receiver when no blanking pulse is being applied. Furthermore, a unique biasing circuit configuration for the FETS has been designed which reduces blanking pulse injection, bias switching transients and sideband splatter as compared to prior art circuits utilizing bipolar transistors and diodes. This facilitates a higher blanking rate than has been heretofore feasible.

Furthermore, the output of the noise detector is constantly monitored by a comparator circuit. If the steady state amplitude of the output exceeds a predetermined threshold, a feedback signal is applied from the comparator to the noise amplifiers which reduces the gain thereof. This protects the noise detector from being rendered nonconductive by continuous radio frequency signals within the band-pass of the noise amplifiers.

DESCRIPTION OF THE PREFERRED EMBODIMENT

Figure 1:
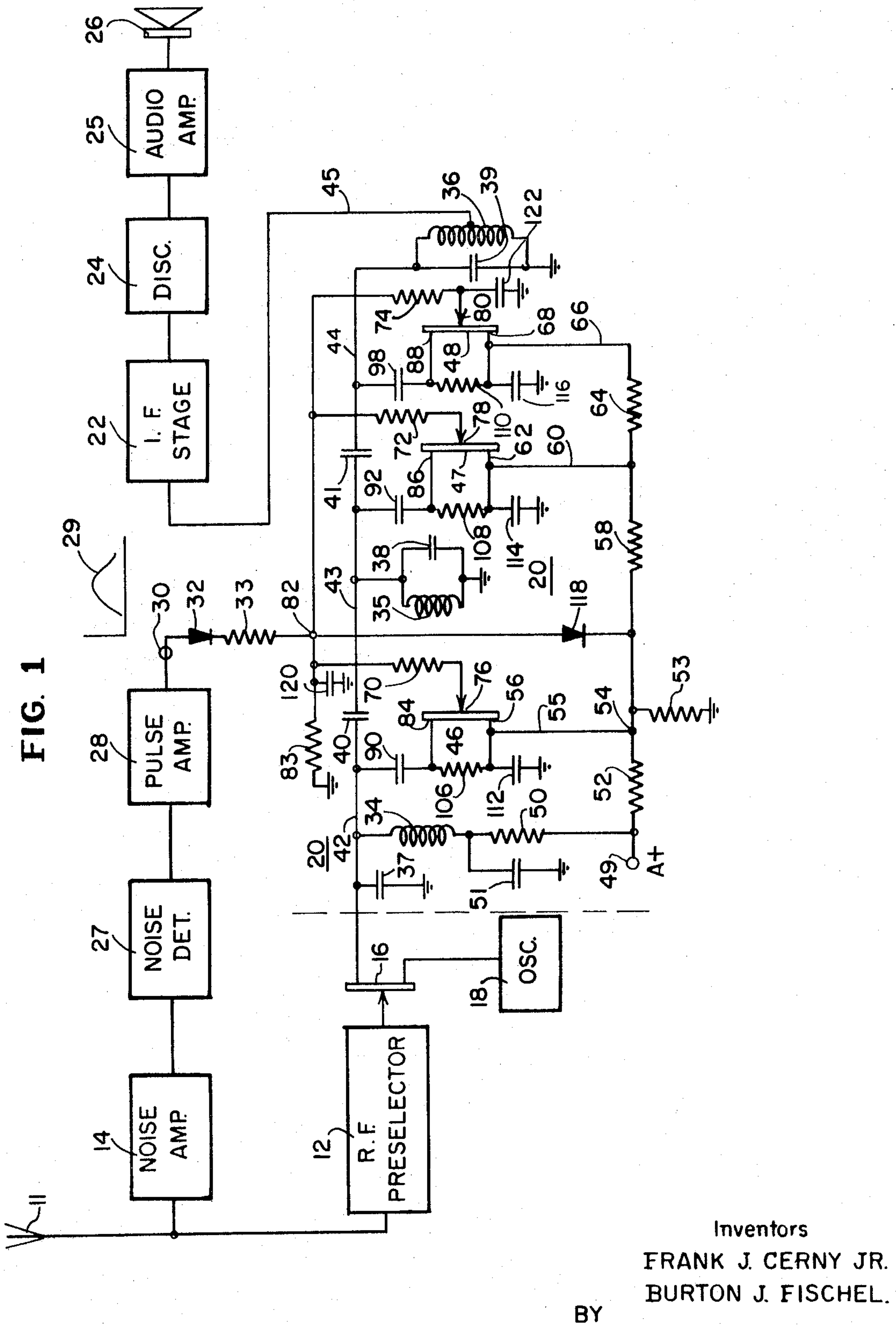
FIG. 1 is a block diagram of a frequency modulation receiver including a noise-blanking circuit in schematic form.

In FIG. 1, a block diagram of a frequency modulation (FM) radio receiver including an intermediate frequency (IF) blanker circuit of one embodiment of the invention is shown. It will be apparent to one skilled in the art, from subsequent parts of this specification, that the blanker circuit could be advantageously employed in other types of receivers and at other locations therein such as in the radio frequency (RF) stages preceding the mixer stage. Both desired and undesired radio waves, which may be accompanied by impulse noise disturbances, are received by antenna 11 and applied to both RF preselector 12 and to noise amplifier 14. Preselector 12, which may be a passive circuit, is tuned to the desired frequency and has the necessary band-pass for receiving at least the desired signal. Because of the difficulty of obtaining selectivity at very high radio frequencies, some unwanted information bearing signals may be passed through preselector 12. The RF noise amplifier 14 is utilized to amplify impulse noises although it will amplify any signal within its band-pass. It may be tuned to a frequency just outside of the band-pass of preselector 12 that there is not a division of the desired signal therebetween. For example, RF preselector 12 might be tuned to 40 MHz. and have a band-pass of 500 kHz. and noise amplifier 14 might be tuned to 42 MHz.

Any radio frequency signals selected by preselector 12 are mixed in field effect transistor (FET) 16 with a signal from local oscillator 18 to derive the desired IF signal, perhaps, along with adjacent unwanted signals. FET 16 may be biased on the square law portion of its characteristics to reduce the production of undesired intermodulation components. Provided that an impulse noise is not being received by antenna 11, the output of FET 16 is filtered by the selectivity of the noise-blanking circuit 20, which is shown in schematic form in the figure to remove some of the unwanted signals therefrom. The operation of IF blanking circuit 20 will be described in detail in a subsequent part of the specification. The output of blanking circuit 20 is applied to a selective IF stage 22 which provides most of the selectivity for the receiver and which selects the desired IF signal. Discriminator 24 which is connected to the output of IF amplifier 22 demodulates the audio signal from the IF signal. Audio amplifier 25, which is connected to the output of discriminator 24, amplifies and applies the demodulated signal to speaker 26.

If an impulse noise is received by antenna 11, it will be conducted to both preselector 12 and to noise amplifier 14, whose output is connected to the input of noise detector 27. After the impulse noise is amplified by amplifier 14, the envelope thereof is demodulated by noise detector 27 and then applied to pulse amplifier 28. The envelope is amplified and its duration is increased by pulse amplifier 28 to provide a noise-blanking pulse 29 at output terminal 30 thereof. Blanking pulse 29 is utilized to activate blanking circuit 20 thereby interrupting all signals passing therethrough for the duration of the noise impulse. Rate sensing circuitry may be included in pulse amplifier 28 for rendering the amplifier inoperative if the repetition rate or duration of the noise impulses exceeds a predetermined maximum whereby blanking would seriously interfere with the intelligibility of the desired signal being produced at speaker 26. Output terminal 30 of amplifier 28 is coupled through diode 32 and resistor 33 to blanking circuit 20 so that blanking pulse 29 may be conducted thereto.

Blanking circuit 20 includes a three section Butterworth filter which is resonant at the IF of the receiver. The filter connects the IF signal from the drain of FET 16 to the input of IF stage 22. The tuned circuits or sections of the Butterworth filter are comprised of inductors 34, 35 and 36 which are respectively connected in parallel with capacitors 37, 38 and 39. One end of each of the tuned sections is connected or coupled to a ground or reference potential. Capacitors 40 and 41 provide signal coupling between tuned sections. The desired signal path between FET 16 and IF stage 22 is comprised of the series circuit including conductor 42, capacitor 40, conductor 43, capacitor 41, conductor 44, the upper portion of inductor 36 and conductor 45. Blanking circuit 20 does not require a filter of precisely this format or connection. For instance, amplifying devices could be placed between the filter sections. FETS (or blanking devices) 46, 47 and 48 are connected across or in shunt with the three sections of the Butterworth filter to blank or short the sections in response to blanking pulse 29.

A supply of positive DC potential is connected to bias terminal 49. Resistor 50 connects bias terminal 49 to one end of inductor 34 so that a positive DC bias potential is supplied through the inductor to the drain of mixing FET 16. Capacitor 51 is connected to the aforementioned end of inductor 34 and provides an RF ground thereto at the intermediate frequency.

Resistors 52 and 53 comprise a voltage divider which develops a positive bias potential for blanking circuit 20 at point 54. Conductor 55 couples the positive potential to source 56 of FET 46. Decoupling resistor 58 and conductor 60 transfer the bias potential from point 54 to source 62 of FET 47. Decoupling resistors 58 and 64 and conductor 66 couple bias potential to source 68 of FET 48. Resistors 70, 72 and 74 respectively connect gates 76, 78 and 80 to point 82 which is coupled to ground through resistor 83 thereby providing a DC return path for the source gate bias. Drain electrodes 84, 86 and 88 are respectively connected through capacitors 90, 92 and 98 to respective signal conductors 42, 43 and 44. Resistors 106, 108 and 110, having high resistances, are connected between the source and drain electrodes of respective FETS 46, 47 and 48. Source electrodes 56, 62 and 68 are respectively connected to the ground potential through capacitors 112, 114 and 116 which, in cooperation with respective resistors 52, 58 and 64, tend to prevent any switching transients generated by any of the FETS from undesirably affecting the other FETS.

Since FETS 46, 47 and 48 are of the N-channel junction type, the positive potential from point 54 reverse biases the junctions formed between sources 56, 62 and 68 and respective gates 76, 78 and 80 thereby holding the FETS in a normally off and/or nonconductive condition so that the FETS provide a very high impedance between the capacitors, e.g., 90 and 112, connected to the signal conducting path and the reference potential. The bias potential developed at point 54 is greater than the pinch-off voltages of the FETS by an amount equal to or greater than the peak signal swing across the tuned circuits to which the FETS are connected. Thus the signal swing cannot bias the FETS on during its peak and thus degrade the intermodulation rejection capability of the FET blanking devices.

Bipolar transistors and diodes, utilized as blanking devices, have nonlinear characteristics even though biased in the off condition. Undesired signals passing through the stages preceding such blanking devices are intermodulated by the diodes or transistors to produce modulation products which may fall within the IF band. These undesirable products are passed through the IF amplifier, demodulated by the discriminator and amplified by the audio amplifier to produce unwanted distortion in the desired signals being produced by the speakers of such receivers. To compensate for this problem, the selectivity of the stages preceding such blankers is often increased to decrease the amplitude of the unwanted signals thereby decreasing the unwanted intermodulation products. This increase in selectivity, however, tends to lengthen or increase the duration of any noise impulse passing therethrough. Hence, the duration of the blanking pulses used in such systems must be lengthened thereby decreasing the maximum blanking pulse rate which can be achieved without producing unwanted distortion or degradation of the audio signal quality.

Since the FETS are biased off with their gate potentials near ground, and since the resistors 106, 108 and 110 maintain the source and drain electrodes of each of the FETS at essentially the same positive potential, the FETS provide a very linear drain to source characteristic. Because of this linear characteristic the FETS do not appreciably facilitate intermodulation between undesired signals at the drain of mixer 16 due to the lack of selectivity of RF preselector 12. Thus, it is not necessary to add additional selectivity in RF preselector 12 which would tend to lengthen the duration of noise impulses. Therefore, blanking circuit 20 can be operated at an increased blanking pulse repetition rate with respect to bipolar transistor or diode blankers.

As has been previously mentioned, diode 32, resistor 33, in cooperation with resistors 70, 72 and 74, provide a path for coupling blanking pulse 29 to gates 76, 78 and 80 of FETS 46, 47 and 48. Blanking pulse 29 overcomes the reverse bias applied between the source to gate junctions thereby rendering the FETS conductive or turned on during the duration of the blanking pulse. While turned on, the FETS in cooperation with the capacitors connected to their source and drain electrodes, e.g. 80 and 112, short or provide a low-impedance path to ground for all AC signals passing from mixer 16 into the blanker. For example, when the blanking signal renders FET 46 conductive, all signals passing through conductor 42 now pass to ground through the path comprised of: capacitor 90, which has a low AC impedance at the IF; FET 46 and capacitor 112, which likewise provides low impedance to ground at the IF.

Resistors 106, 108 and 110 prevent source-drain bias changes which might excite the filter elements or otherwise interfere with the desired signal when the FETS come out of blanking at the termination of the blanking pulse. Diode 118, which is forward biased by a blanking pulse in combination with resistor 53, limits the amplitude of the blanking pulse so that it cannot forward bias the gate-source junction of any of the FETS. This likewise tends to prevent transient noise which might otherwise be introduced into the desired signal.

Diode 32, resistor 33, resistor 83 and capacitor 120 cooperate to form a blanking pulse shaping circuit. More specifically, resistor 33 and capacitor 120, in combination with resistors 70, 72 and 74 and the input capacity, ($C_{iss}$) of the respective FETS provide shaping of the leading edge of blanking pulse 29. This prevents unwanted frequency components of the blanking pulse from being passed through the drain to gate capacitance ($C_{rss}$) which might excite the tuned sections of the Butterworth filter thereby increasing the necessary length or duration of the blanking pulse. Resistor 83 and capacitor 120 control the fall time of the blanking pulse. Inasmuch as diode 32 is reversed biased when the blanking pulse begins to fall, it isolates the two time constants provided by foregoing resistor and capacitor combinations. The duration of the blanking pulse, as previously mentioned, depends on the duration of the impulse noise envelope.

Since the drain-gate capacitance of the FET is lower in magnitude and more linear with respect to applied voltage than the corresponding capacitance in a bipolar transistor or diode, the FETS provide much greater isolation between the blanking pulse and the signal conduction path. Therefore, it is possible to utilize blanking pulses having a much faster rise-and-fall time when utilizing the FETS as compared to a shunt blanker utilizing bipolar transistors or diodes. Accordingly, the rise-and-fall time can be decreased thus decreasing the total duration of the blanking pulse thereby facilitating blanking at a much higher repetition rate without creating output signal distortion in the blanking circuit utilizing FETS. This desirable result is made possible in part by the biasing configuration of the FETS employed in this circuit shown in FIG. 1. The blanker circuit shown in FIG. 1 is capable of operating at a blanking rate on the order of five times the blanking rate of similar blankers utilizing bipolar transistors and diodes.

Because of the inherent delay in a given noise impulse occasioned by noise amplifier 14, noise detector 27 and pulse amplifier 28, it is foreseeable that a noise impulse may begin developing in the first filter section comprised of inductor 34 and capacitor 37 before the blanking pulse arrives to turn on FET 46 and thus blank that section. However, because of the inherent delay characteristic of the cascade frequency responsive networks of filter sections comprised of inductor 34 and capacitor 37 and the filter section comprised of inductor 35 and capacitor 38, the impulse noise will arrive at FET 47 at a relatively later time with respect to the blanking pulse and at FET 48 at a still later time with respect to the blanking pulse. Thus, while FET 46 might only blank the noise impulse at its 30 db. point, FET 48 might blank the noise impulse noise at its 90 db. point while also blanking the sideband splatter introduced by the blanking action of FETS 46 and 47. The last blanking stage thus shorts out or blanks the noise impulse signals at a low amplitude during its initial rising portion. Furthermore, because the selectivity of the filtering stages preceding the last blanking stage tend to eliminate many of the unwanted frequency components before they are applied to the last blanking device, and since the last blanking device immediately precedes IF amplifier 22, it is the one that has the greatest control over the blanking function and it is the one most likely to produce sideband splatter. Therefore, capacitor 122 is connected to gate 80 of FET 48 to control the rise time of blanking pulse 29 applied thereto thus reducing sideband splatter which could have frequency components within a band-pass of IF amp 22.

Figure 2:
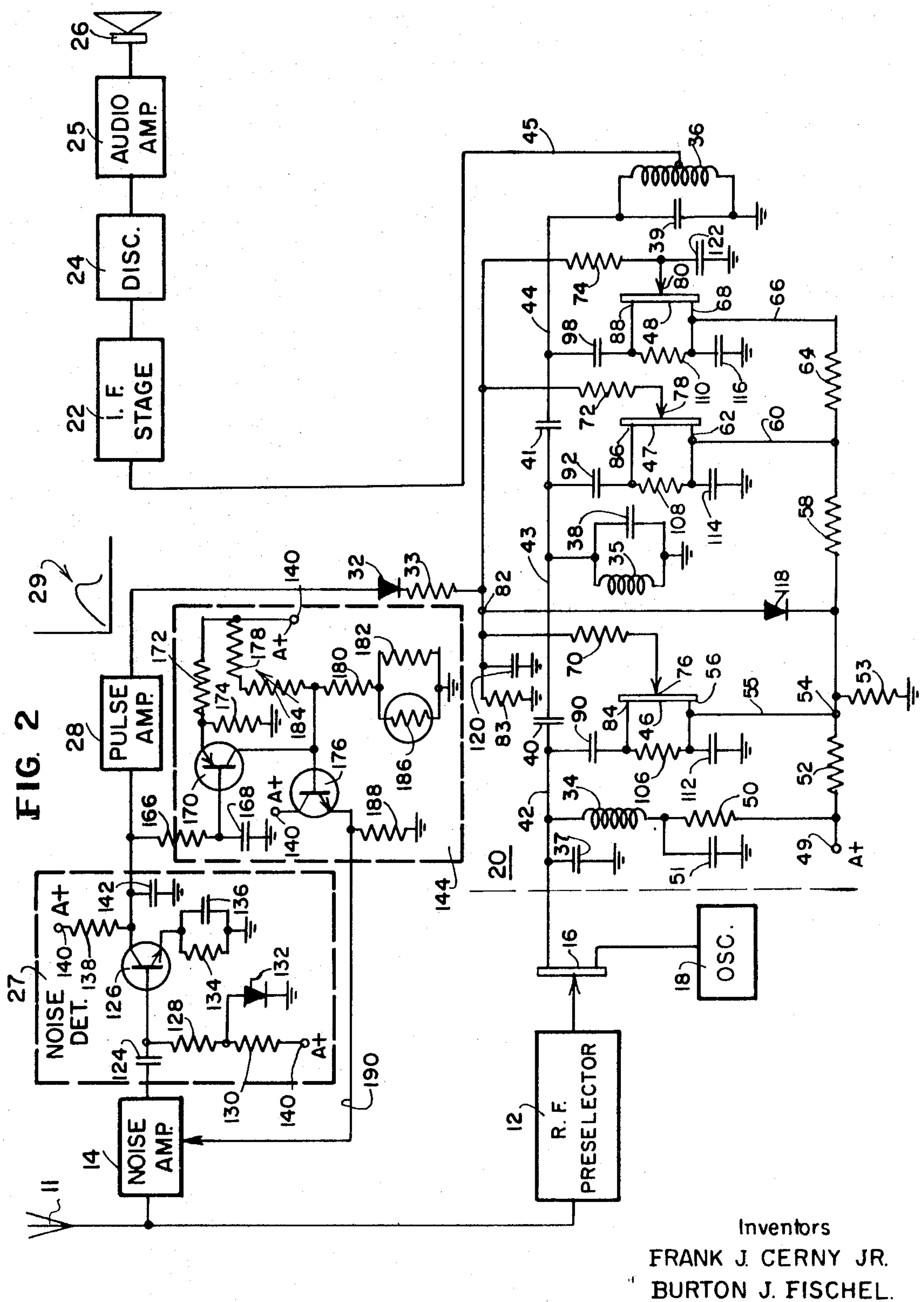
FIG. 2 is a schematic diagram of a noise detector and a protective feedback circuit which can be used in the system of FIG. 1.

In FIG. 2, noise envelope detector 27 is shown in schematic form. Capacitor 124 couples signals occurring at the output of noise amplifier 14 to the base of transistor 126. The network comprised of resistors 128, 130 and diode 132 provide a temperature compensated bias to the base of transistor 126 in a known manner. Resistor 134, which is connected between the emitter of transistor 126 and the reference potential, adds DC stability to the amplifier. Envelope bypass capacitor 136 is connected in parallel with resistor 134 to increase the AC gain of the amplifier which includes transistor 126. Resistor 138 is connected between bias supply terminal 140, which may be the same as terminal 49, and the collector of transistor 126. Capacitor 142 couples the collector of transistor 126 to ground to provide a low-impedance path for the RF content associated with a noise impulse signal while providing high impedance to the noise envelope.

In operation, transistor 126 is biased class B so that only the negative halves of a noise impulse signal is developed at the output thereof. After the RF content of the noise impulse is filtered out by capacitor 142, only the negative going envelope of the impulse noise remains and, as previously described, this is applied to pulse amplifier 28 which inverts and amplifies the envelope to generate noise blanking pulse 29. As long as noise amplifier 14 receives only noise impulse signals, detector 27 operates in a satisfactory manner even though desensitizing circuit 144 is not connected thereto; however, if noise amplifier 14 receives a continuous RF carrier signal, the base-collector junction of transistor 126 will rectify the carrier signal thereby tending to charge capacitor 142 in a negative-going direction with respect to the bias potential at terminal 140. The potential on capacitor 142 will eventually reach a level where the base-collector junction of transistor 126 is forward biased thereby rendering it nonresponsive to noise impulse signals and, hence, destroying the usefulness of the blanking system.

Desensitization circuit 144 includes an integrator comprised of resistor 166 and capacitor 168 which are connected in series between the output of noise detector 27 and ground. The base of comparator transistor 170 is connected to the junction point between resistor 166 and capacitor 168. The emitter of transistor 170 is connected to a voltage divider comprised of resistors 172 and 174 which are connected in series between bias terminal 140 and ground. The voltage developed at the junction of resistors 172 and 174 provides a reference. The collector of comparator transistor 170 is connected to the base of transistor 176 which forms a common collector amplifier suitable for driving a low-impedance load. The base of transistor 176 is also connected to the network comprised of resistors 178, 180 and 182 in combination with both variable resistor 184 and thermistor 186. This network provides a temperature-compensated bias voltage to the base of transistor 176. The collector of transistor 176 is connected to bias terminal 140. The emitter is connected both to ground through load resistor 188 and to the bases of the gain control transistors included in noise amplifier 14.

In operation, if transistor 126 begins to rectify a continuous RF signal applied thereto from noise amplifier 14, the voltage across capacitor 142 will begin to drop and hence the voltage on the base of transistor 170 will drop. If the steady state voltage on the base of transistor 170 becomes more than one junction drop less than the reference voltage at the junction of resistors 172 and 174, transistor 170 will be rendered conductive thereby increasing the forward bias being applied to transistor 176. This raises the voltage level across resistor 188. Capacitor 168 provides a low-impedance path to ground for noise pulse envelope signals so that they do not effect the conduction of transistor 170. The increase in voltage level across resistor 188 is connected by conductor 190 to increase the forward bias on the gain control transistors included in noise amplifier 14 to thereby reduce the gain thereof ad decrease the amplitude of the continuous RF signal applied to transistor 126. Hence, noise detector 27 is rendered immune to continuous RF signals which would otherwise saturate the detector, consequently making the whole blanking system useless.

Although the preferred embodiment has been described with reference to an IF blanking circuit having three stages, it is apparent that the number of stages could be reduced or increased depending upon the specific requirements of a particular application. Moreover, it is clear to one skilled in the art that certain obvious modifications could be made in the circuitry of the blanker while still remaining within the scope of the invention. Although N-channel junction FETS have been used here, the same type of performance can be achieved by using either P-channel or N-channel devices that are either junction-type FETS or insulated-gate FETS (IG FETS or MOS FETS) with one or more gates. The same basic theory is applicable in all cases.

What has been described, therefore, is a unique blanking system for use in a radio receiver requiring high intermodulation rejection capability. The blanker circuit of the system can be operated at a higher blanking rate because it produces less intermodulation and injection interference than previous blanking circuits including bipolar and/or diode blanking elements. Moreover, a feedback circuit is included between the noise detector and noise amplifier which renders the noise detector virtually nonresponsive to continuous RF signals applied thereto.

We claim:

1. An impulse-noise-blanking system for use in a radio receiver having a first circuit for conducting a desired signal which may be accompanied by impulse noise disturbances, a second circuit for repeating the desired signal, and a third circuit having a signal path for transferring the desired signal from the first circuit to the second circuit, said impulse-noise-blanking system including in combination:

amplifying means connected to the first circuit;

impulse-noise-demodulating means connected to said amplifying means for deriving impulse noise disturbances therefrom;

pulse-forming means connected to said demodulating means for producing a blanking pulse of a predetermined amplitude, rise time and fall time, in response to the impulse noise disturbance;

at least one field effect transistor having drain, source and gate electrodes, said drain and source electrodes being coupled between the signal path of the third circuit and a reference potential, said gate electrode being coupled to said pulse-forming means, said field effect transistor being rendered conductive by said blanking pulses thereby forming a low-impedance path between the signal path and the reference potential during said blanking pulse for all signals passing into said third circuit so that said impulse noise disturbance is not conducted to said second circuit.

2. The impulse-noise-blanking system of claim 1 wherein said drain electrode is coupled to the signal path of the third circuit and said source electrode is coupled to said reference potential.

3. The impulse-noise-blanking system of claim 1 further including a blanking pulse amplitude limiting network comprised of a diode in series with a resistor;

said network being connected between said gate electrode of the field effect transistor and said reference potential, said diode being oriented so that it is rendered conductive by said blanking pulse;

said diode and resistor limiting the amplitude of said blanking pulse so that it cannot forward bias the gate-source junction of said field effect transistor and introduce switching transients into the signal path.

4. The impulse-noise-blanking system of claim 1 wherein the gate-source capacitance of said field effect transistor is designed to have a low magnitude and to be relatively independent of the voltage developed thereacross.

5. The impulse-noise-blanking system of claim 1 wherein said third circuit means includes:

first capacitor means coupling said drain electrode to said signal path;

second capacitor means coupling said source electrode to said reference potential;

resistive means connecting said gate electrode to said reference potential;

bias means applying a reverse bias between said source electrode and said reference thereby reverse biasing the gate to source junction of said field effect transistor thus rendering it in a normally nonconductive condition;

said blanking pulse overcoming said reverse bias whereby said field effect transistor is rendered conductive;

said first capacitor means, said field effect transistor and said second capacitor means providing said low-impedance path to the reference potential during the duration of said blanking pulses for all signals being delivered to said third circuit means from said first circuit means.

6. The impulse-noise-blanking system of claim 5 wherein a resistor is connected between said source and drain electrodes of said field effect transistor for holding the same at essentially the same direct current level so that switching transients are not introduced into said signal path of the third circuit, and so that said field effect transistor is operated over a linear portion of its drain to source characteristics.

7. The impulse-noise-blanking system of claim 1 wherein the third circuit includes:

a plurality of frequency responsive networks tuned to the frequency of the desired signal which are cascaded with each other between the signal path and the reference potential;

a plurality of said field effect transistors being included in the third circuit, each of said field effect transistors being connected across each of said frequency responsive networks and between said signal path and said reference potential;

each of said frequency responsive networks successively delaying the impulse noise disturbance, said impulse noise disturbances thereby arriving at successive ones of said field effect transistors at a correspondingly later time with respect to said blanking pulse;

said field effect transistor connected across the last cascaded frequency responsive network thereby providing a low-impedance path to the reference potential when the noise impulse disturbance is at a low amplitude during the initial rising portion thereof.

8. The impulse-noise-blanking system of claim 7 wherein said frequency responsive elements are the sections of a Butterworth filter.

9. The impulse-noise-blanking system of claim 7 wherein a fourth capacitor means is connected between the reference potential and the gate electrode of said field effect transistor connected across the last cascaded frequency responsive network for shaping said blanking pulse applied to said gate electrode so that unwanted sideband splatter is not generated and passed into the second circuit.

10. An impulse-noise-blanking system for use in a radio receiver having a first circuit for conducting a desired signal which may be accompanied by undesired signals and impulse noise disturbances, a second circuit for repeating the desired signal, and a third circuit having a signal path for transferring the desired signal from the first circuit to the second circuit, said impulse-noise-blanking system including in combination:

amplifying means connected to the first circuit, at least one gain control transistor being included in said amplifying means;

impulse-noise-demodulating means connected to said amplifying means for deriving impulse noise disturbances therefrom, said impulse-noise-demodulating means having an undesirable tendency to be rendered inoperative by the undesired signals whereby its output goes to steady state potential of a given polarity;

integrator means connected to the output of said noise-demodulating means;

comparator means having first and second inputs and an output, said first input being connected to said integrator means, said output being coupled to the base of said gain control transistor;

reference voltage supply means connected to said second input of said comparator means and supplying a reference voltage of a given amplitude thereto;

said comparator means developing a control voltage at its output in response to the amplitude of said steady state voltage exceeding said given amplitude of the reference voltage;

said control voltage reducing the gain of said automatic gain control transistors thus counterbalancing the effect of the unwanted signals on said impulse-noise-demodulating means;

pulse-forming means connected to said demodulating means for producing a blanking pulse of a predetermined amplitude, rise time and fall time, in response to the impulse noise disturbance;

at least one field effect transistor having drain, source and gate electrodes;

said drain and source electrodes being coupled between the signal path of the third circuit and a reference potential said gate electrode being coupled to said pulse-forming means, said field effect transistor being rendered conductive by said blanking pulses thereby forming a low impedance path between the signal path and the reference potential during said blanking pulse for all signals passing into said third circuit so that said impulse noise disturbance is not conducted to said second circuit.

* * * * *